(12) United States Patent
Ganesan

(10) Patent No.: US 8,850,544 B1
(45) Date of Patent: Sep. 30, 2014

(54) USER CENTERED PRIVACY BUILT ON MASHSSL

(76) Inventor: Ravi Ganesan, Half Moon Bay, CA (US)

( * ) Notice: Subject to any disclaimer, the term of this patent is extended or adjusted under 35 U.S.C. 154(b) by 1156 days.

(21) Appl. No.: 12/428,473

(22) Filed: Apr. 23, 2009

Related U.S. Application Data

(60) Provisional application No. 61/047,104, filed on Apr. 23, 2008.

(51) Int. Cl.
*G06F 17/30* (2006.01)
*H04L 29/06* (2006.01)

(52) U.S. Cl.
USPC ...... 726/8; 726/27; 726/28; 726/29; 713/151; 713/169; 713/170; 713/171; 713/172; 713/174

(58) Field of Classification Search
USPC .......................................................... 726/8
See application file for complete search history.

(56) References Cited

U.S. PATENT DOCUMENTS

| | | | | |
|---|---|---|---|---|
| 7,017,041 B2 * | 3/2006 | Sandhu et al. | ................ | 713/156 |
| 7,770,206 B2 * | 8/2010 | Dillaway et al. | ................ | 726/2 |
| 2003/0217288 A1 * | 11/2003 | Guo et al. | ..................... | 713/201 |
| 2005/0086197 A1 * | 4/2005 | Boubez et al. | .................... | 707/1 |
| 2005/0235153 A1 * | 10/2005 | Ikeda | .............................. | 713/176 |
| 2006/0005026 A1 * | 1/2006 | Song et al. | ..................... | 713/173 |
| 2006/0107325 A1 * | 5/2006 | Kanestrom et al. | ............. | 726/26 |
| 2007/0050624 A1 * | 3/2007 | Lord et al. | .................... | 713/168 |
| 2007/0115927 A1 * | 5/2007 | Pearson | ........................ | 370/352 |
| 2007/0150804 A1 * | 6/2007 | Foulger et al. | ................ | 715/513 |
| 2007/0174636 A1 * | 7/2007 | Raja | ............................. | 713/189 |
| 2007/0256143 A1 * | 11/2007 | Prafullchandra et al. | ........ | 726/28 |
| 2008/0052348 A1 * | 2/2008 | Adler et al. | .................... | 709/203 |
| 2008/0098223 A1 * | 4/2008 | Tan et al. | ...................... | 713/170 |
| 2008/0215675 A1 * | 9/2008 | Kaminitz et al. | ............. | 709/203 |
| 2008/0301766 A1 * | 12/2008 | Makino et al. | .................... | 726/1 |
| 2009/0060201 A1 * | 3/2009 | Rhodes et al. | ................ | 380/279 |
| 2009/0150968 A1 * | 6/2009 | Ozzie et al. | ...................... | 726/1 |
| 2009/0180617 A1 * | 7/2009 | Peterka | ........................ | 380/277 |
| 2009/0259839 A1 * | 10/2009 | Jung et al. | .................... | 713/155 |
| 2010/0161968 A1 * | 6/2010 | Pravetz | ........................ | 713/156 |

\* cited by examiner

*Primary Examiner* — Ashok Patel
*Assistant Examiner* — Gary Gracia

(57) ABSTRACT

The present invention provides a new method for user centered privacy which works across all $3^{rd}$ party sites where users post content, or even for encryption of emails. Users have an identity with a Hyde-It Identity provider (HIP) which authenticates the user to a Hyde-It Service (HITS) which performs key distribution. The functionality can be invoked through a user toolbar, built into the browser or be downloaded on demand via a bookmarklet.

6 Claims, 1 Drawing Sheet

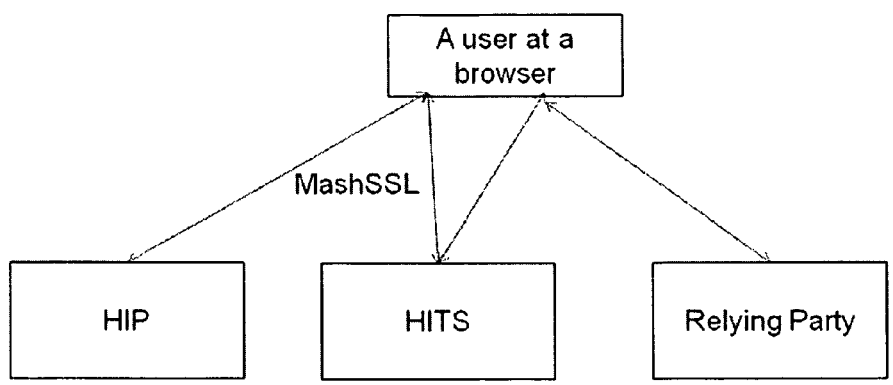

The user authenticates to the Hyde-It Service (HITS) using the Hyde-It Identity Provider (HIP) as an identity source, and with MashSSL as the protocol. The relying party site has data which the user is going to encrypt (when it is in the browser) using the HITS service. There could be HITS which are capable of performing the function for different types of relying parties (e.g. webmail, social networks, wikis, blogs, etc.)

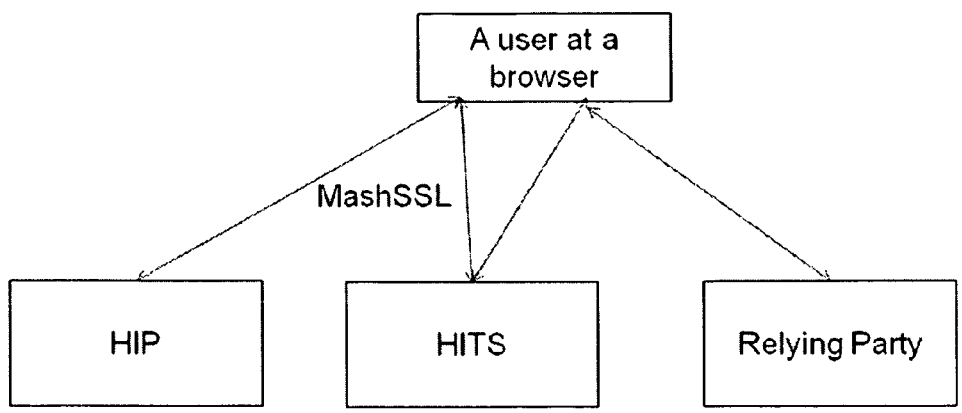

The user authenticates to the Hyde-It Service (HITS) using the Hyde-It Identity Provider (HIP) as an identity source, and with MashSSL as the protocol. The relying party site has data which the user is going to encrypt (when it is in the browser) using the HITS service. There could be HITS which are capable of performing the function for different types of relying parties (e.g. webmail, social networks, wikis, blogs, etc.)

USER CENTERED PRIVACY BUILT ON MASHSSL

RELATED APPLICATIONS

This application claims priority based on Provisional U.S. Application Ser. No. 61/047,104, filed Apr. 23, 2008, and entitled "USER CENTERED PRIVACY", the contents of which are incorporated herein in their entirety by reference.

TECHNICAL FIELD

This invention relates to security and privacy. More particularly it relates to encryption of data to achieve privacy.

BACKGROUND OF THE INVENTION

User encryption of content continues to be virtually non-existent. For instance while dozens of attempts have been made to provide for email encryption, a vast majority of emails are still sent without end to end encryption. The advent of social networking has worsened the situation. People, especially the younger generation have grown used to putting sensitive personal data on social networking sites. While most of these sites have some basic mechanism of determining who can see what content, it is controlled by the particular social network. So for instance a teenager has to remember who is in their 'friends' list on each social networking site they use. Or consider blogs and similar tools like wikis. In general something you write on your blog or enter into a wiki is available to absolutely everyone.

We define user centered privacy, as privacy that is enforced by the user, not by the particular email, social network, wiki or blog they use. In user centered privacy, the user can choose, regardless of which system they are on, to encrypt data in a fashion that it can only be viewed by those allowed to view it.

OBJECTIVES OF THE INVENTION

This invention has the following objectives:
Create a user centered privacy system built on top of the MashSSL protocol called Hyde-It that:
Allows the user to authenticate to a "Hyde-It Identity Provider" (HIP)
Allows the user to maintain "ryngs" which are lists of other users.
Allows the user to use various "Hyde-It Services" (HITS) that allow the user to encrypt content on various email, social networking, blogs, wikis, etc. We call these $3^{rd}$ party services "relying parties" (RP) and some may be actively participating in the overall
Allows other user to decrypt content if they have permission.

While the $3^{rd}$ party site (say a social network) on which data is being encrypted and decrypted may choose to integrate more closely with the Hyde-It system (perhaps making a HITS for that site unnecessary), we do not require cooperation of the $3^{rd}$ party—rather our objective is to make the privacy user centric.

Additional objects, advantages, novel features of the present invention will become apparent to those skilled in the art from this disclosure, including the following detailed description, as well as by practice of the invention. While the invention is described below with reference to preferred embodiment(s), it should be understood that the invention is not limited thereto. Those of ordinary skill in the art having access to the teachings herein will recognize additional implementations, modifications, and embodiments, as well as other fields of use, which are within the scope of the invention as disclosed and claimed herein and with respect to which the invention could be of significant utility.

SUMMARY DISCLOSURE OF THE INVENTION

The first objective of our invention is to allow a first user to authenticate to a Hyde-It Service (HITS) using an identity provided by a Hyde-It Identity Provider (HIP) using the MashSSL protocol.

The second objective of our invention is to allow the first user to encrypt data when it is it) in the user's browser from a $3^{rd}$ party relying party site using the appropriate HITS service.

The third objective of our invention is to allow a second user to decrypt data which they have permission to see.

The fourth objective of our invention is to allow any user to maintain 'ryngs' which are lists of users, so that they can perform encryption for an entire ryng.

BRIEF DESCRIPTION OF DRAWINGS

FIG. 1 depicts a user at a browser, a HIP, a HITS and a relying party. The user is going to authenticate to the HITS using the HIP by running MashSSL and then the HITS is going to perform encryption/decryption of the data for the user as the case might be.

PREFERRED EMBODIMENT(S) OF THE INVENTION

The set up for our preferred embodiment (as shown in FIG. 1) is as follows:
A user at a web browser who has a Hyde-It toolbar (or add-on as they are sometimes called), unless the functionality is directly built into the browser. The user has some authentication mechanism it shares with the HIP, say a password or a one time password, but in addition it has a second factor we call 2F which is stored locally (in local storage, on a USB, a smart phone or even on a smartcard). The entire functionality may be implemented using bookmarklets which download the required code, but in our preferred embodiment we shall assume the presence of a toolbar.
The HIP which has knowledge of the authentication method, say a password or one time password. And also stored a one way hash of 2F which we call 2F+. Observe that the HIP cannot recover 2F from 2F+.
The HITS which perform encryption/decryption for users knows for each user in the system a one way hash of 2F+ which we call 2F++.
The $3^{rd}$ party relying party which could be a web mail application, a social network, a blog, a wiki, etc. While the relying party could choose to participate in the system, potentially making the need for a HITS unnecessary, in our preferred embodiment we will assume that no cooperation is required from the $3^{rd}$ party.
Finally, as an option, the user has set up various 'ryngs'. These are basically lists of other users on the system. For instance a user might have a ryng for her family members, her colleagues at work, her personal friends, etc. Ryngs might share no common members (e.g. family and colleagues at work might have no one in common). Might have overlap (e.g. colleagues at work and personal friends could have common members). Or one ryng might even be completely contained in another ryng (e.g. personal friends might include all family members).

The user, let us call her Alice, visits a third party site, for instance a social network, and enters various content. She can select content she wants to keep private and clicks 'Hyde-It' on the toolbar. She will be prompted to ask who should be able to decrypt it, and she might either select individuals or indicate a particular ryng.

The toolbar then selects a fresh randomly generated session key to encrypt the content and proceeds to encrypt the content. This is happening at the browser itself and the data need not leave the browser.

The toolbar then facilitates MashSSL between the HIP and the appropriate HITS with MashSSL scrambling performed using a combination of the authentication information and 2F+.

The toolbar then sends the HITS the session key and the list of users (or ryngs) who should be able to decrypt the data. The HITS takes the session key and encrypts it with the 2F++ for each user. So for instance if the message is meant to be read by Cathie, Nancy and Rachael, then the HITS will create data structures that could look like: Cathie=Encrypt(session key, Cathie_2F++); Nancy=Encrypt(session key, Nancy_2F++); Rachael=Encrypt(session key, Rachael_2F++). The HITS returns these data structures to the toolbar.

The toolbar posts the encrypted content, along with the data-structures onto the appropriate web site, or simply places the data_structures on the form in the browser and it gets posted to the web site in the normal course of however the data is posted from browser to web site.

Now when users visit Alice's social networking site, the encrypted data will not be readable by most users. However, if Cathie, Nancy or Rachael visit the site then the toolbar, which knows their identity, and has access to each of their 2F++, can either (i) seamlessly decrypt the data for them, or (ii) indicate to them that if they click 'Fynd-It' then it can decrypt the encrypted portions of the content.

Users might also choose to 'hyde' data which only they can see. For instance, they might choose to enter and 'hyde' their passwords to various sites and store the encrypted passwords on a special purpose HITS. The toolbar could retrieve it, decrypt it and place it in the expected place in the form.

For applications such as web email the toolbar might automatically detect the list of people who should be able to decrypt the data by looking at the To: list.

The central point is that the user is in control of managing the privacy of their content on the web, and does not have to rely on encryption services, or authorization services provided by each web service. In other words, user centric privacy.

Naturally, users who are not part of the Hyde-It system cannot view the data and the system will provide ways to invite them to join the system to see the data and seek permission from the user to join their appropriate ryngs. In the event very large ryngs to form individual key distribution may not scale well, and those practiced in the art can easily see how users can be given 2F++ group keys as well. For instance by default there can be a 2F++ for all Hyde-It users.

Finally, it will be obvious to those practiced in the art that this mechanism can be incorporated into non-web desktop products like word processors and email clients.

What is claimed is:

1. A method for performing user centered privacy which works universally across all web services, but without requiring the web services to implement or enforce said privacy mechanisms or any encryption mechanism, wherein:
   a) each user in a Hyde-It system has an identity, a first authentication factor such as a password and a second authentication factor called 2F which is stored locally in a memory on a user device;
   b) a Hyde-It Identity Provider (HIP) which stores the user identity, their first authentication factor such as a hash of their password; and a hash of the second authentication factor 2F, called 2F+;
   c) the user can store multiple 'ryngs' at the HIP which are lists of other users;
   d) a Hyde-It Service (HITS) which stores for each user a hash of 2F+, called 2F++;
   wherein there is a toolbar at the user's browser which allows the user to select content which the user is allowed to edit at a 3rd Party site, wherein the user selects content to keep secret;
   specifying, by the user, other users or ryngs who can decrypt the selected content, the toolbar then selects a fresh randomly generated session key to encrypt the selected content and proceeds to encrypt the content;
   wherein the toolbar initiates the HIP and the HITS to perform MashSSL with the MashSSL scrambling happening using a combination of the user's first authentication factor and 2F+;
   the toolbar encrypts the specified content with the session key, send the session key and the list of users/ryngs who would be able to decrypt the content to the appropriate HITS;
   the HITS prepares data structures for key distribution by creating userid:encrypt(session-key,valid user 2F++), where each data structure contains the userid of a user who can decrypt the data, and the session key encrypted with that particular user's 2F++;
   the HITS returns the data structures to the toolbar and the toolbar adds the data structures to the encrypted content; and
   the toolbar either posts the encrypted content with data structures to the appropriate website or relies on whatever mechanism the web application has of posting the content from the browser to the website.

2. A method according to claim 1, wherein the user can choose to encrypt content and store it on-line such that only they can retrieve it later.

3. A method according to claim 1 where users who cannot decrypt data can ask for permission to join the system and be able to see the data.

4. A method according to claim 1 where a user who is part of the system but is not able to decrypt the data can request permission from the user encrypting the data, to see the data and be added to the appropriate ryng.

5. A method according to claim 1 where individual 2F++ are augmented with group based 2F++ for scale.

6. A method according to claim 5 where, by default all users of a particular Hyde-It system share a group key which allows them to see data which users make visible to any user of the Hyde-It system.

* * * * *